(12) United States Patent
Chuang et al.

(10) Patent No.: US 8,166,369 B2
(45) Date of Patent: *Apr. 24, 2012

(54) METHOD FOR ERROR PROCESSING IN OPTICAL DISK MEMORIES

(75) Inventors: Cheng-Te Chuang, Hsin-Chu (TW); Eric Huang, Hsin-Chu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 882 days.

This patent is subject to a terminal disclaimer.

(21) Appl. No.: 12/237,384

(22) Filed: Sep. 24, 2008

(65) Prior Publication Data

US 2009/0037793 A1    Feb. 5, 2009

Related U.S. Application Data

(60) Division of application No. 10/832,970, filed on Apr. 26, 2004, now abandoned, which is a continuation of application No. 09/778,628, filed on Feb. 7, 2001, now Pat. No. 6,751,771.

(51) Int. Cl.
 *G11C 29/00* (2006.01)
(52) U.S. Cl. ........................................ 714/769; 714/774
(58) Field of Classification Search .................. 714/769, 714/774
See application file for complete search history.

(56) References Cited

U.S. PATENT DOCUMENTS

| | | | |
|---|---|---|---|
| 4,309,721 A | 1/1982 | Christopher | |
| 4,562,577 A | 12/1985 | Glover et al. | |
| 4,564,945 A | 1/1986 | Glover et al. | |
| 4,680,764 A | 7/1987 | Suzuki et al. | |
| 4,698,810 A | 10/1987 | Fukuda et al. | |
| RE33,462 E | 11/1990 | Suzuki et al. | |
| 5,027,357 A | 6/1991 | Yu et al. | |
| 5,414,720 A * | 5/1995 | Kadokawa | 714/766 |
| 5,668,976 A * | 9/1997 | Zook | 703/24 |
| 5,745,453 A * | 4/1998 | Ikeda | 372/46.012 |
| 5,917,836 A | 6/1999 | Ichikawa et al. | |
| 5,920,578 A | 7/1999 | Zook | |
| 5,930,367 A | 7/1999 | Osawa et al. | |
| 5,956,757 A | 9/1999 | Sun | |
| 5,991,911 A | 11/1999 | Zook | |
| 5,996,105 A | 11/1999 | Zook | |
| 6,003,151 A | 12/1999 | Chuang | |
| 6,035,433 A | 3/2000 | Sako et al. | |
| 6,048,090 A | 4/2000 | Zook | |
| 6,052,815 A | 4/2000 | Zook | |
| 6,130,866 A | 10/2000 | Shigenobu et al. | |
| 6,141,787 A | 10/2000 | Kunisa et al. | |
| 6,263,469 B1 | 7/2001 | Jang | |
| 6,445,795 B1 | 9/2002 | Sako et al. | |
| 6,470,473 B1 | 10/2002 | Iwasa | |
| 6,721,917 B2 | 4/2004 | Shieh | |
| 7,177,528 B1 * | 2/2007 | Yada et al. | 386/222 |

* cited by examiner

*Primary Examiner* — M. Mujtaba K Chaudry
(74) *Attorney, Agent, or Firm* — Winston Hsu; Scott Margo (57) ABSTRACT

A method of correcting and detecting errors in a sector of data stored in a DVD format is provided. The method includes: calculating an initial error detection value for data within the sector, performing an error correction operation on the data within the sector and determining an updated, intermediate error detection value responsive to the error correction operation, using a target error detection value and one of the initial error detection value and the intermediate error detection value to determine that the sector doesn't include errors, processing an outer code to provide a set of error patterns and error locations, and determining if any of the error locations are for data within the sector and not correcting data corresponding to the error locations within the sector.

8 Claims, 5 Drawing Sheets

DVD Sector Decoder Block Diagram

Figure 1. DVD Data sector configuration

Figure 2. ECC block configuration

Figure 3. ECC block after row interleave

Figure 4. DVD-ROM decoder block diagram

Figure 5. DVD Sector Decoder Block Diagram

Figure 6. Alternate DVD-ROM Decoder Architecture

Figure 7. Example of valid and invalid outer code error correction requests

METHOD FOR ERROR PROCESSING IN OPTICAL DISK MEMORIES

CROSS REFERENCE TO RELATED APPLICATIONS

This is a divisional application of co-pending U.S. patent application Ser. No. 10/832,970 (filed on Apr. 26, 2004) that is a continuation of U.S. patent application Ser. No. 09/778,628 (filed on Feb. 7, 2001 and now issued as U.S. Pat. No. 6,751,771), which are included herein by reference.

BACKGROUND

The present invention relates to a method and apparatus for decoding data stored on a mass storage medium, for example an optical storage disk that stores data in a DVD-ROM format.

DVD-ROM (digital versatile disk, read only memory) is for many applications a successor product to the CD-ROM format popularly used for recording and distributing data. A single-side, single-layer DVD-ROM disk can hold up to 4.7 GB (gigabytes) of data, or about seven times the capacity of the conventional CD-ROM. The high storage capacity of DVD-ROM is achieved in part by recording data as smaller pits along narrower tracks, as compared to the way that data are stored on CD-ROM disks. DVD-ROM also achieves higher capacity as compared to CD-ROM by using a more efficient sector data encoding scheme. The data format and the data encoding scheme for DVD-ROM disks are considerably different and more complex than those used for CD-ROM disks. As such, data processing and error decoding functions are different for the newer DVD-ROM format.

Data processing and error decoding functions have been refined over the course of many years for CD-ROM devices. An example of the highly optimized data processing and decoding of CD-ROM data is illustrated in U.S. Pat. No. 6,003,151, which describes partially concurrent error detection and Reed-Solomon error correction for CD-ROM data. The techniques described in this patent provide incremental but significant improvements in data processing rates. Various other optimized data processing strategies are implemented to facilitate the high speed reading and processing of data from CD-ROM disks. Consequently, when DVD-ROM was initially introduced as a data storage medium, the highly refined CD-ROM processing and decoding techniques allowed CD-ROM devices to have significantly better data access times than the less refined and newer DVD-ROM devices. This initial performance disparity slowed the adoption of the DVD-ROM storage format. As such, there was and there continues to be a need to improve the processing and decoding of DVD-ROM data. Thus, while the error decoding schemes for DVD-ROMs are different and considerably more complex than those used for CD-ROM disks, aspects of the concurrent error detection and error correction schemes described in U.S. Pat. No. 6,003,151 conceivably might improve sector processing speed and capability for DVD-ROM drives.

Decoding DVD-ROM disks requires knowledge of the data encoding on the disk. The DVD-ROM sector-encoding flow consequently is described to provide a background for understanding the improvements of the present invention. The encoding and decoding of CD-DA and CD-ROM data are described first for comparison purposes.

The original compact disk standard was promulgated and eventually adopted for the distribution of digitized audio. The resulting specification is called the Red Book (ICE 908) and the data storage medium was called CD-DA, for compact disk-digital audio. Two layers of error correction codes, identified as C1 and C2 in IEC 908 and ISO/IEC 10149, are encoded with the audio data on CD-DA. When such a disk is played back, the pits on the surface of the disk are sensed by a laser pickup head and converted to a serial bit stream. The bit stream is then demodulated and split to thirty-two byte frames that are processed by a C1 error corrector. The C1 error correction codes are (32, 28) Reed-Solomon codes over the Galois field $GF(2^8)$ and can typically correct two errors in each frame. After the C1 corrections, the four C1 parity bytes are discarded, the other twenty-eight bytes in the frame are de-interleaved for the first time and the bytes are sent to the C2 error corrector. This first de-interleaving mixes data bytes from two adjacent C1-corrected frames to form the twenty-eight byte input to the C2 error corrector. The C2 error correction codes are (28, 24) Reed-Solomon codes over $GF(2^8)$ and can typically correct two errors in each frame. After C2 error correction, the four C2 parity bytes are discarded and the remaining twenty-four bytes are de-interleaved for a second time. The second de-interleaving mixes data bytes from twenty-four different C2 frames to generate twenty-four bytes of audio data, organized as six couples of sixteen-bit left-channel and sixteen-bit right-channel digital audio data.

C1 and C2 error corrections reduce the error rates of the digital audio data read from a disk. Furthermore, the data bit exchange accomplished in the first and second de-interleaving processes improves the playability of defective disks. When a scratch on a disk surface introduces a burst of errors, the erroneous data are de-interleaved into many different frames, thus reducing the number of errors per frame and increasing the probability of successful error corrections. On the other hand, the inclusion of parity bytes for two layers of error correction codes greatly reduces the amount of data that can be stored on a disk.

When a compact disk is used as a digital data storage medium, generally the data are stored in the CD-ROM format, which adds a third layer of Reed-Solomon error correction codes to the CD-DA data formatting to ensure the integrity of data read from the CD-ROM disk. This third layer of error correction codes, sometimes called C3, is applied to 2352 byte frames (or sectors) extracted from the C1- and C2-corrected and twice de-interleaved data stream. Note that the 2352 byte frame is different from the thirty-two byte and twenty-eight byte frames to which the C1 and C2 layers of error correction codes are applied. In some documents, including ISO/IEC-10149, the C1 or C2 frame is called the small frame.

C3 is a Reed-Solomon product-like code (RSPC), as is described in ISO/IEC-10149 and in U.S. Pat. No. 6,003,151. A thirty-two bit error detection code (EDC) is also encoded in CD-ROM sectors to provide a further data integrity check, generally in the form of a cyclic redundancy code. The utilization of C3 and EDC encoding further limits the capacity of digital data that can be stored on a CD-ROM. As a matter of fact, to record 2048 bytes (16384 bits) of user data according to the CD-ROM format, 57624 channel bits are stored on the surface of a CD-ROM.

Figure 1:
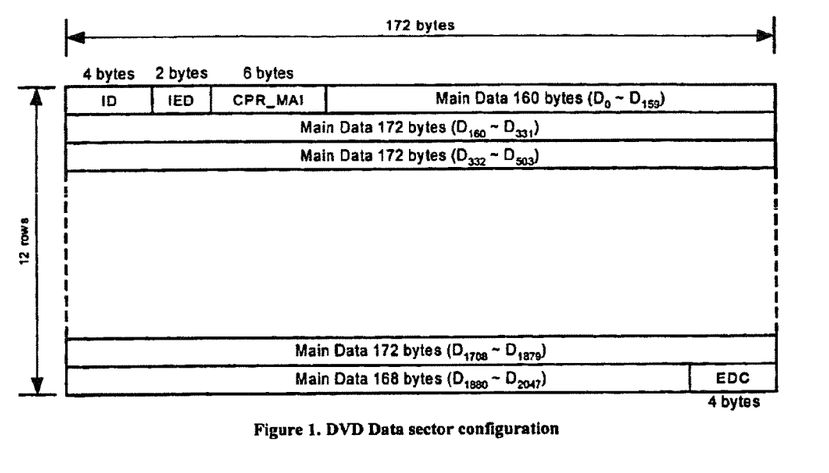
FIG. 1 schematically illustrates the types of data and the organization of data in a DVD-ROM sector.

DVD-ROM is a general-purpose data storage medium. Unlike the CD-ROM format, which may store data in a variety of sector formats, e.g., Mode 1 and Mode 2 Form 1, the DVD-ROM format stores data in only one sector format. Each DVD-ROM data sector consists of 2048 bytes of main data (similar to the user data in a CD-ROM sector), twelve bytes of identification data (ID) and other header data, and four bytes of error detection code data (EDC). FIG. 1 shows the data sector configuration for a DVD-ROM disk.

The four-byte identification data (ID) contains attributes and the physical address of the DVD-ROM sector. The bits of the identification data and the ID error detection code (IED) together form a (6, 4) Reed-Solomon code, which is decoded to detect as well as to correct errors in the important ID data. The six-byte copyright management information (CPR_MAI) provides data for copyright protection and region management. The error detection code (EDC) is a four-byte cyclic redundancy check code attached to the 2060 bytes of ID, IED, CPR_MAI and main data before scrambling. Calculation of the EDC for each 2060 byte codeword is conventional and can be illustrated as follows. Suppose the MSB of the first byte of ID is $b_{16511}$ and the LSB of the last byte of the EDC is $b_0$, then the EDC code word is selected so that the polynomial $$l(x) = b_{16511}x^{16511} + b_{16510}x^{16510} + \ldots + b_2x^2 + b_1x + b_0 \quad (1)$$

is evenly divisible by the polynomial $g(x) = x^{32} + x^{31} + x^4 + 1$. The four-bytes of EDC data are determined separately for each EDC codeword to cause the polynomial assembled according to Equation 1 to be evenly divisible by this check polynomial $g(x)$. Note that the check polynomial $g(x)$ for the DVD-ROM format is different from the EDC check polynomial dictated by the CD-ROM standard.

Figure 2:
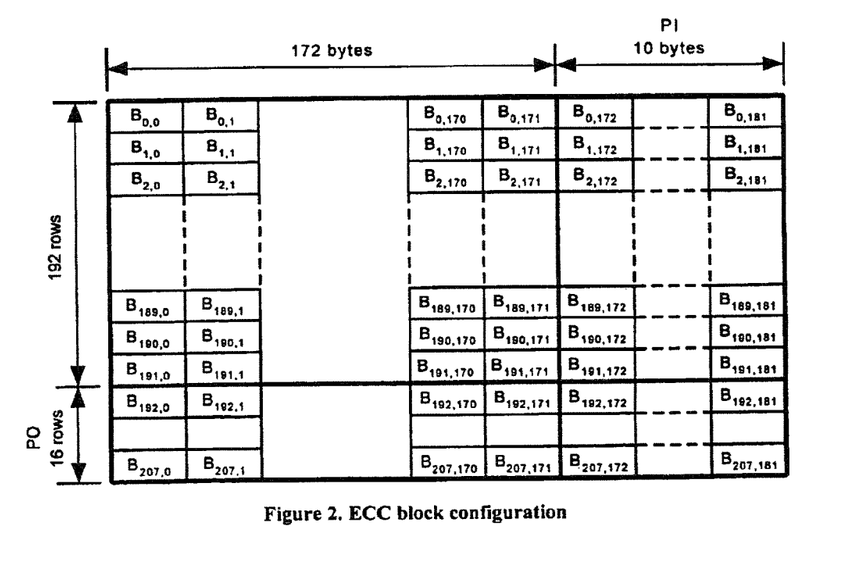
FIG. 2 schematically illustrates the types of data and the organization of data within the DVD-ROM block protected by Reed-Solomon inner and outer codes.

After EDC calculation, the main data are scrambled by exclusive-ORing the main data with a string of bytes selected according to the sector identity or position within a block or sector. Sixteen different addresses are assigned among sixteen main data sectors and each of the sixteen sectors is scrambled with a predetermined string of scrambling bytes. Sixteen different scrambling strings are used corresponding to the sixteen different addresses. The sixteen scrambled data sectors are then grouped into an ECC block, which is encoded using a Reed-Solomon product code. FIG. 2 shows the ECC block configuration.

To construct an ECC block, sixteen scrambled data sectors, each 172 bytes by twelve rows, are concatenated to form a 172-byte by 192-row matrix, as shown in the upper-left portion of FIG. 2. Ten inner-code parity (PI) bytes are appended to each of the 192 rows of Main Data to produce a (182, 172) Reed-Solomon code. Finally, sixteen outer-code parity (PO) bytes are appended to each of the 182 columns to produce a (208, 192) Reed-Solomon code. The resulting ECC block is a 208-row by 182-byte matrix, where the rows are (182, 172) Reed-Solomon codes called the inner codes, and the columns are (208, 192) Reed-Solomon codes called the outer codes.

Figure 3:
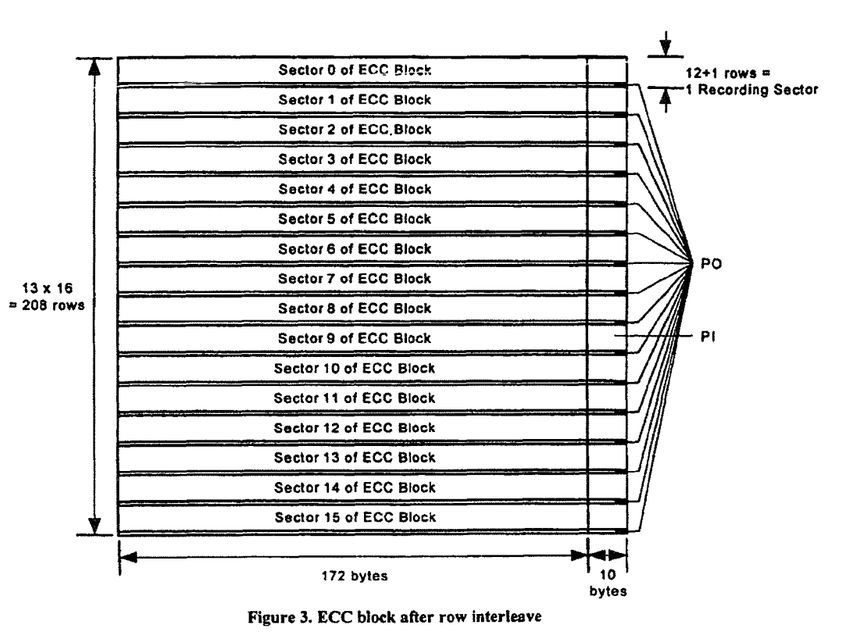
FIG. 3 schematically illustrates the interleave pattern used in storing the FIG. 2 ECC block on a DVD-ROM disk.

When an ECC block like that illustrated in FIG. 2 is recorded on a disk, the sixteen rows of outer-code parity bytes PO are interleaved to the end of each of the twelve rows of sector data and inner-code parity, as shown in FIG. 3. The data consisting of thirteen rows of 182 bytes forming the ECC block after row interleave are collectively referred to as the recording sector. Recording sectors are finally converted by 8/16 modulation and SYNC-code insertion to provide a sequence of channel bits, which becomes the reflectivity modulation on the surface of the DVD-ROM disk.

Table I provides a comparison between aspects of the data formatting, processing and error protection for CD-ROM and DVD-ROM disk formats.

TABLE I

|     | CD-ROM (Mode-1) | DVD-ROM |
| --- | --- | --- |
| EDC | For SYNC, Header and User Data. | For ID, IED, CPR_MAI and Main Data. |
| ECC | On single sector before scrambling. | On ECC block of 16 data sectors after scrambling. |

TABLE I-continued

|     | CD-ROM (Mode-1) | DVD-ROM |
| --- | --- | --- |
| Scrambling | On Header, User Data, EDC and ECC. | On Main Data Only. |

SUMMARY

An aspect of the present invention provides a method of correcting and detecting errors in a sector of data stored on an optical disk in a DVD format. The method includes: calculating an initial error detection value for data within the sector, performing an error correction operation on the data within the sector and determining an updated, intermediate error detection value responsive to the error correction operation, using a target error detection value and one of the initial error detection value and the intermediate error detection value to determine that the sector doesn't include errors, processing an outer code to provide a set of error patterns and error locations, and determining if any of the error locations are for data within the sector and not correcting data corresponding to the error locations within the sector.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Aspects of the present invention can be better understood with reference to the drawings, described briefly below, which form a part of the present disclsure.

DETAILED DESCRIPTION

Preferred embodiments of the present invention provide methods and apparatus for more efficiently retrieving and processing data stored on an optical disk in a DVD format. Generally, the retrieval and processing of data includes inner and outer code error correction for a Reed-Solomon product like code and an error detection process for evaluating an extent of errors in a sector of data. For this device, the sector of data is encoded within a plurality of inner codes and parts of plural sectors encoded within each outer code. Methods according to the present invention include calculating an initial and generally also an intermediate error detection value for data within the sector. The target for the error detection value is non-zero because the data within the sector is scrambled. If there is a match between the initial or intermediate error detection value, the sector can be presumed to be free of errors. Decisions as to whether error correction operations are to be made or how error correction operations are to be performed are then made on the basis of the knowledge that some or all of the sectors within a block of DVD-ROM are free of errors.

For example, inner code logic might perform an error correction operation on the data within the sector to generate an updated, intermediate error detection value in response to the error correction operation. The intermediate error detection value is compared to a target error detection value to determine if errors are present in the sector. If there are no errors in the sector, the method might cause error correction to be skipped, discontinued or skipped in part. This strategy can significantly improve the speed of processing DVD-ROM data.

Additional strategies for improving the speed and accuracy of retrieving and processing DVD data are explained below. This discussion first illustrates the structure and operation of certain preferred embodiments of the present invention, with particular reference to the figures.

Figure 4:
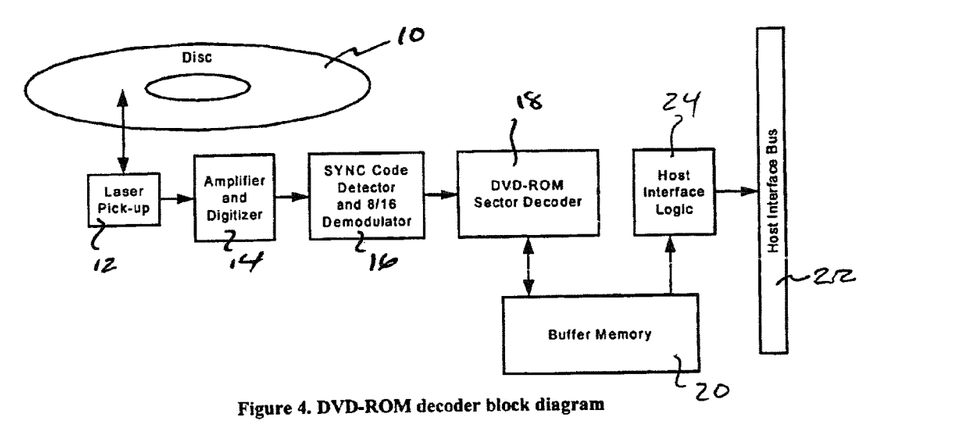
FIG. 4 schematically illustrates a DVD-ROM data retrieval system.

FIG. 4 shows the data flow in a DVD-ROM device that may implement preferred aspects of the present invention. Data are read from a DVD-ROM disk 10 using a laser beam in pick-up 12 to sense the reflectivity variations on the disk surface and generate a waveform that is amplified and digitized in digitizer 14 to provide the channel bit stream for the device. A SYNC-code detector and an 8/16 demodulator 16 then converts the channel bit stream to sets of data that are recognizable as having the DVD-ROM sector format. The read-out sectors are sent to a DVD-ROM sector decoder 18 for error correction and error detection. A buffer memory 20 is provided to store sectors received from the 8/16 demodulator 16 as well as sectors being decoded. If error correction and error detection on buffered sectors are completed successfully, the sectors can be transferred to the host interface bus 22, which might be an IDE bus, with the transfer conducted through the host interface logic 24. Generally the host interface bus 22 is a peripheral bus within a host computer, but other configurations are possible. This discussion focuses on the processing of error correction codes and error detection codes within the DVD-ROM sector decoder and so does not address the conventional aspects of interfacing to a host computer.

The error correction and error detection codes in DVD-ROM sectors and CD-ROM sectors work similarly—the error correction codes are used to detect and correct a limited number of errors present in the read out data. The error detection codes provide a simple way to check whether the data bits within a read out data sector are all good or not. In comparison to the cross-interleaved Reed-Solomon codewords used in the C3 encoding of a CD-ROM disk, the inner and outer codes of a DVD-ROM format disk are more complex. The differences between the CD-ROM and DVD-ROM error processing can be seen by comparing U.S. Pat. No. 6,003,151, which describes aspects of CD-ROM error processing, with U.S. Pat. No. 5,991,911, which describes aspects of DVD-ROM error processing.

The decoding of DVD-ROM data differs from CD-ROM decoding in aspects including the following:

1. The inner codes of a DVD-ROM ECC block are (182, 172) Reed-Solomon codes, which can typically correct up to five errors per codeword. The P vectors (vertical codewords) of CD-ROM format sectors can typically correct only one error.

2. The DVD-ROM outer codes are (208, 192) Reed-Solomon codes, which can typically correct up to eight errors per codeword. The Q vectors (diagonal codewords) of CD-ROM format sectors can typically correct only one error.

3. The DVD-ROM outer codes are encoded for data over the sixteen sectors that make up an ECC block, so that error correction using the outer codes cannot start until all sixteen sectors of an ECC block are received. The P and Q vectors of CD-ROM format sectors are encoded for every sector, allowing error correction to start as soon as a sector is received.

4. Whenever a DVD-ROM outer codeword is decoded, multiple errors in multiple sectors may be located and corrected for each codeword. For CD-ROM format sectors, error correction is limited to one sector.

It is possible to implement Reed-Solomon decoders that can correct up to ten errors in an inner code and up to sixteen errors in an outer code. On the other hand, aspects of the present invention can be applied to implementations that can correct varying numbers of correctable errors, so the typical eight correctable errors per outer codeword implementation will be assumed in the following discussion.

Figure 5:
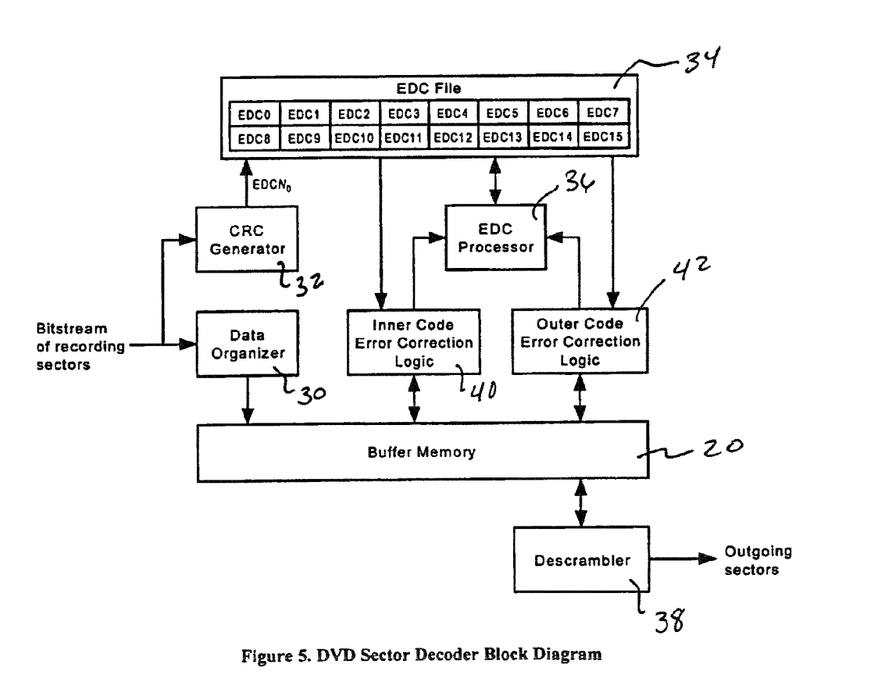
FIG. 5 illustrates aspects of one configuration of a DVD-ROM sector decoder.

Many arrangements of inner code correction, outer code correction and error detection function blocks are possible. One implementation that can be used to illustrate aspects of the present invention is shown in FIG. 5. FIG. 5 schematically illustrates the architecture of a DVD-ROM sector decoder like that shown at 18 in FIG. 4. The figure shows a more detailed illustration of the interaction between the sector decoder 18 and the buffer memory 20 of FIG. 4, as well.

The functions of the circuits shown in FIG. 5 include:

1. Data Organizer 30: A circuit that converts the serial bitstream input from the 8/16 demodulator 16 to parallel words and transfers the obtained words to the buffer memory.

2. CRC Generator 32: A cyclic redundancy code generator, which divides the input bitstream by a check polynomial to produce a remainder. In general, the CRC generator 32 is a linear feedback shift register, or a modification of such a shift register. The feedback for the shift register is configured so that the CRC generator 32 performs modulo 2 division by the DVD generator polynomial $g(x)=x^{32}+x^{31}+x^4+1$ on the data string input to the CRC generator. Uncorrected DVD data read from a disk pass through the CRC generator. When a sector of DVD data passes through the CRC generator 32, the CRC generator 32 produces as an output a thirty-two bit number. This thirty-two bit number is the initial EDC result for that sector. When an entire ECC block passes serially through the CRC generator 32, sixteen thirty-two bit initial EDC results are generated for the sixteen sectors within the ECC block.

3. EDC File 34: Contains sixteen thirty-two-bit registers for storing the initial EDC results generated by the CRC generator 32, as well as the intermediate EDC results generated by the EDC processor 36, of the sixteen sectors in an ECC block. When an ECC block is read into the FIG. 5 decoder, each successive sector of the ECC block passes through the CRC generator 32 and a corresponding initial EDC result is calculated and stored into the EDC file. As error correction processing, typically Reed-Solomon error processing, is performed on the ECC block, the EDC processor 36 calculates intermediate EDC results that are then stored in the EDC file 34. In an alternate embodiment, the EDC file 34 might include thirty-two thirty-two-bit registers, with sixteen of the registers holding the initial or intermediate EDC remainders and a corresponding sixteen registers holding the target EDC remainder values representative of corrected or error free sectors.

4. Buffer Memory 20: A random access memory to which incoming read out data sectors are stored and later accessed for error corrections. The buffer memory stores sectors of data awaiting correction, during correction and correct data awaiting transfer to the host computer. When the host computer requests or otherwise indicates it is prepared to receive data, the data are accessed from the buffer memory for transfer. Sector data are read from the buffer memory 20 and descrambled by the descrambler 38 before the data are transferred to a host interface bus 24 (FIG. 4).

5. Inner Code Error Correction Logic 40: Reads inner codes of sectors from the buffer memory 20 for error correction, performs Reed-Solomon error correction on the inner codes and generates error correction information. With each error correction, the inner code error correction logic modifies the erroneous error bytes in the buffer memory 20, typically by overwriting the erroneous byte or bytes, and the error information (error pattern and location for each erroneous byte) is passed to the EDC processor 36. Responsive to this information, the EDC processor 36 updates the EDC file 34 with the EDC result in the register corresponding to the sector containing the corrected error. The inner code error correction logic 40 might, for example, correspond to that illustrated in FIG. 4 and the accompanying text of U.S. Pat. No. 5,991,911, which is hereby incorporated by reference in its entirety and specifically these referenced portions and those portions referenced below.

6. Outer Code Error Correction Logic 42: Reads outer codes of ECC blocks from the buffer memory 20 for error correction, performs Reed-Solomon error correction on the outer codes and generates error correction information. With each error correction, the error byte in buffer memory 20 is modified, again typically by overwriting the erroneous byte, and the error information (error pattern and location) is passed to the EDC processor 36, which updates the EDC result in the register corresponding to the sector containing the corrected error in the EDC file 34. The outer code error correction logic 42 might, for example, correspond to that illustrated in FIG. 5 and the accompanying text of U.S. Pat. No. 5,991,911.

7. EDC Processor 36: Receives the error information from the inner code error correction logic 40 and the outer code error correction logic 42 to update the EDC results in the EDC file. Updating the results in the EDC file requires that the EDC processor determine how the value of the EDC remainder would differ from the initial or last calculated value of the EDC remainder if the EDC remainder were recalculated for the corresponding sector after the erroneous byte or bytes were corrected.

Simplistically, the calculation performed by the EDC processor could be achieved by reading the entire sector of data out of the buffer memory after the erroneous data are corrected and passing the sector data string through the CRC generator or a like linear feedback shift register. Such a calculation strategy would be slow, for the reasons discussed in both of U.S. Pat. Nos. 6,003,151 and 5,991,911. A preferable strategy is to calculate an update to a previously calculated EDC remainder, accounting for both the error pattern (identifying the bits of an erroneous byte to be changed) and the error location (position of the bytes within the sector long bitstream) in determining the correction to the data. The general strategy for calculating this correction is set forth in columns 12-15 of U.S. Pat. No. 6,003,151. Both U.S. Pat. Nos. 6,003,151 and 5,991,911 are hereby incorporated by reference for their teachings regarding the calculation of CRC or EDC remainders both with respect to linear feedback shift registers and with respect to the use of multiplying circuitry to calculate an update to a previously calculated EDC remainder.

The general strategy for calculating updates to EDC remainders is set forth in the above-referenced section of U.S. Pat. No. 6,003,151. One way of implementing the EDC processor 36 for DVD-ROM is illustrated in FIG. 10 of U.S. Pat. No. 5,991,911 and the functionality of that circuit is described in columns 23-25 of that patent. Other techniques, mathematically equivalent to the strategy shown in these two patents, might also be used.

8. Descrambler 38: Descrambles the sectors read from the buffer memory 20 on the fly so that the descrambled sector data can be eventually provided to a host interface bus 22 (FIG. 4).

The operation of the FIG. 5 DVD-ROM sector decoder is now discussed. In a decoder in accordance with the architecture illustrated in FIG. 5, the data organizer 30 receives the bitstream containing read out sectors of DVD-ROM data and converts it to words that are stored to the buffer memory 20. While the data bitstream is being organized into parallel words and stored into the buffer memory 20, the bitstream is also sent to the CRC generator 32, where the incoming bitstream is divided by the DVD-ROM check polynomial $g(x) = x^{32} + x^{31} + x^4 + 1$. After the last bit of the EDC field is received and processed, the CRC generator 32 outputs a thirty-two-bit initial EDC result, which indicates the initial error characteristics (syndrome) of the just received and processed sector of DVD-ROM data. The initial EDC result is denoted EDC $N_0$, where N is 0, 1, 2, . . . , 15 for the first, second, third, . . . , and sixteenth sector in a read out ECC block and the subscript "0" indicates that the stored EDC results are initial values for the uncorrected data.

Referring to FIG. 1 and FIG. 2 and taking sector 0 in an ECC block as an illustrative example, the polynomial $l_0(x)$ that is divided by $g(x)$ in the CRC generator 32 consists of bytes $B_{0,0}$ to $B_{0,171}$, $B_{1,0}$ to $B_{0,171}$, . . . , and $B_{11,0}$ to $B_{11,171}$ in FIG. 2. The polynomial $l_0(x)$ is the EDC codeword that includes the serialized bits that make up one sector of data and represents the unit of data protected by an EDC word. Suppose the MSB of $B_{m,n}$ is $B_{m,n,7}$ and the LSB of $B_{m,n}$ is $B_{m,n,0}$, then the initial EDC result, $EDC0_0$ is $$EDC0_0 = l_0(x) \bmod g(x), \qquad (2)$$

where $$l_0(x) = B_{0,0,7} x^{16511} + \ldots + B_{0,171,0} x^{15136} + B_{1,0,7} x^{15135} + \ldots + B_{1,171,0} x^{13760} + \ldots + B_{11,0,7} x^{1375} + \ldots + B_{11,171,0}. \qquad (3)$$

Note that the EDC codeword for a DVD-ROM sector encodes ID, IED, CPR_MAI, and main data before scrambling, i.e., l(x) in Equation (1) includes main data prior to that data being scrambled. In Equation (2), however, the initial value $EDC0_0$ is calculated for $l_0(x)$, which includes the scrambled main data bits that are read from the disk. Thus, $EDC0_0$ will be a certain value rather than zero, if the received sector has no errors. This differs from what would be expected for an unscrambled EDC codeword, where the error-free $EDC0_0$ syndrome would be zero. Moreover, the error-free EDC value takes on sixteen different, predetermined values due to the sixteen different sets of scrambling data used for every sixteen groups of sixteen sectors.

DVD-ROM sectors are not descrambled before the DVD-ROM sector data are stored into the buffer memory 20 because the DVD-ROM Reed-Solomon product-like codes (RSPC) (inner and outer codewords) encode scrambled data. To simplify DVD-ROM error correction, the DVD-ROM decoder preferably does not descramble a sector before its error correction processing is complete. This is different from the process employed within CD-ROM error decoders such as that described in U.S. Pat. No. 6,003,151. CD-ROM data are descrambled before storage into a buffer memory, before error correction and before error detection. Because of this, the error detection (EDC remainder) calculations do not result in zero results for corrected or error-free data during most of the operation of the FIG. 5 decoder.

Scrambling of a DVD-ROM sector is achieved by exclusive-ORing the main data of the sector with a specific byte string. According to the DVD-ROM standard, sixteen different scrambling byte string patterns are defined for each of the sixteen ECC blocks, and all sectors in an ECC block have the same scrambling pattern. The relation between $l(x)$ in Equation (1) and $l_0(x)$ in Equation (3) for the first sector in an ECC block may thus be expressed as $$l_0(x)=l(x)+S(x). \quad (4)$$

Here, $S(x)$ is the polynomial representing the scrambling byte string for that ECC block, and the '+' is equivalent to the exclusive-OR operation. Substituting $l_0(x)$ in Equation (2) by Equation (4) gives $$EDCO_0=\{l(x)+S(x)\} \bmod g(x) \quad (5)$$

$$=\{l(x) \bmod g(x)\}+\{S(x) \bmod g(x)\} \quad (6)$$

For an error-free DVD-ROM sector, $l(x) \bmod g(x)$ will be zero. Consequently, the initial EDC result or syndrome for a sector, as well as the intermediate EDC results while that sector is undergoing error correction, will equal $\{S(x) \bmod g(x)\}$ if the sector has no errors. Since $S(x)$ has only sixteen possible forms, all sixteen values of $\{S(x) \bmod g(x)\}$ can be calculated in advance and built into the EDC file 34 in FIG. 5 for faster error detection. For example, these sixteen values might be stored in a table within sixteen thirty-two-bit registers within a thirty-two register embodiment of the EDC file 34.

Given the above error detection rule, the DVD-ROM sector decoder can perform error correction and detection in accordance with preferred embodiments of the present invention. Specifically, error correction proceeds for each sector of data received by the buffer memory 20 with the inner code error correction logic 40 first decoding the sector's inner codes one by one in the following manner:

1. For each inner code codeword, ten syndrome bytes are calculated.

2. If any of the ten syndrome bytes are non-zero, errors exist in this inner code. The inner code error correction logic 40 formulates a set of equations for these syndromes, and solves the set of equations to determine the error locations and patterns. If the syndromes are all zero, then errors do not exist in this inner code and the next inner code is evaluated.

3. For each set of error pattern and error location data, an erroneous byte in the buffer memory 20 is corrected by overwriting the byte with its correct value. Meanwhile, 4. The error pattern and error location are sent to the EDC processor 36, which calculates an adjustment to the EDC result to account for the corrected error and then the EDC processor 36 updates the appropriate EDC result in the register within the EDC file 34 for that sector.

After an entire ECC block is received and stored in the buffer memory 20, outer code error correction begins. The outer code error correction logic 42 processes the outer codes as following:

1. For each outer code codeword, sixteen syndrome bytes are calculated.

2. If any of the sixteen syndrome bytes are non-zero, errors exist in this outer code codeword. The outer code error correction logic 42 formulates a set of equations for the syndromes, and solves the set of equations to determine the error locations and patterns. If the sixteen syndromes are all zero, then errors do not exist in this outer code and the next outer code is evaluated.

3. For each set of error pattern and error location data, an erroneous byte in the buffer memory 20 is corrected by overwriting the erroneous byte with its correct value. Meanwhile, 4. The error pattern and error location are sent to the EDC processor 36, which calculates an adjustment to the EDC result to account for the corrected error and then updates the appropriate EDC result in the appropriate register within the EDC file 34 for that sector.

Finally, the error-corrected sectors are ready to be transferred to the host interface bus 22 (FIG. 4). Since the sector data in the buffer memory 20 are in scrambled form, they are descrambled by the descrambler 38 before being sent to the host interface logic 24 (FIG. 4), which provides the descrambled, corrected data stream to the host interface bus 22.

According to preferred aspects of the present invention, one or more strategies may be implemented to improve the efficiency of the DVD-ROM data and error processing described above. For example, 1. If the initial EDC results of all sectors in an ECC block are equal to the appropriate, error free (but non-zero) values of $\{S(x) \bmod g(x)\}$, the ECC block is most likely error-free and both inner code error correction and outer code error correction can be skipped for that ECC block. This comparison might be performed by the EDC processor by accessing the appropriate register in the EDC file 34 and comparing that EDC remainder value to the target EDC remainder value $\{S(x) \bmod g(x)\}$ for that sector. The target remainder value may be calculated by the EDC processor, stored in the EDC processor, or stored in an enlarged version of the EDC file 34.

2. The inner code error correction can be skipped for sectors whose initial EDC result is equal to the appropriate value of $\{S(x) \bmod g(x)\}$.

3. The inner code error correction can be stopped for a sector after the intermediate EDC result of the sector has been updated so as to become equal to the appropriate value of $\{S(x) \bmod g(x)\}$. Using this strategy, inner code error correction commences and the value of the updated intermediate EDC remainder is compared to the target value $\{S(x) \bmod g(x)\}$ after each correction. When the values of these two thirty-two bit words are bit-wise equal, error correction for that inner codeword can be discontinued, since the probability of remaining error is very low.

4. The outer code error correction can be skipped for an ECC block if all intermediate EDC results of the sectors in the ECC block have become $\{S(x) \bmod g(x)\}$ after inner-code error correction.

5. The outer code error correction can be stopped for an ECC block if all intermediate EDC results of the sectors in the ECC block have been updated so as to become equal to the appropriate values of $\{S(x) \bmod g(x)\}$. Thus, outer code correction begins and progresses. After each correction to the data stored in the buffer memory 20, the outer code correction logic 42 passes the error patterns and the error position data to the EDC processor 36. The EDC processor calculates a new value of the intermediate EDC remainder for the sector of data in which the error data was corrected and the EDC processor compares all of the intermediate EDC remainder values to their target values. The process described in this paragraph is expedited and simplified to some extent if the EDC processor 36 maintains a flag register indicating the results of the most recent comparison between each of the sixteen intermediate EDC remainders and their target EDC value, so that comparisons need not be unnecessarily repeated.

Each of the strategies listed immediately above in paragraphs 1-5 can be implemented together, individually or in combination to achieve significant improvements in efficiency.

Figure 6:
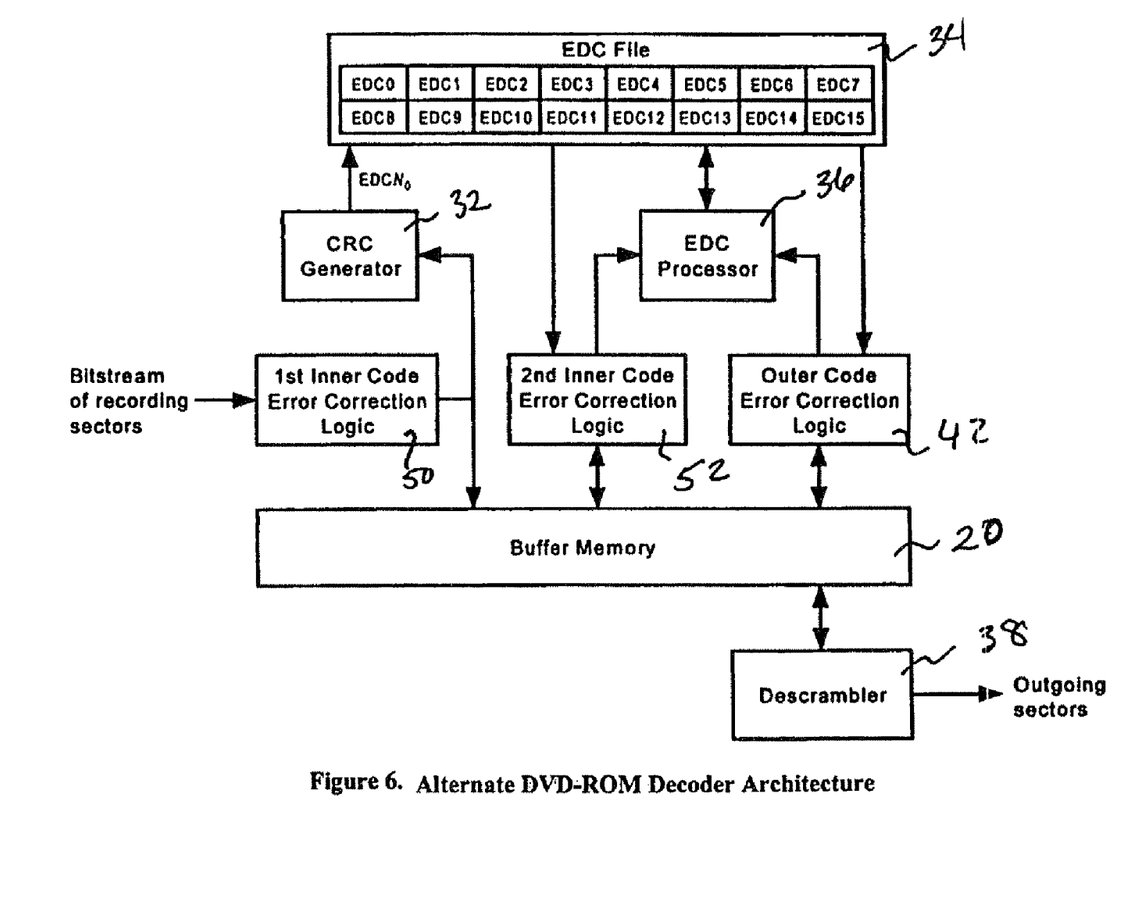
FIG. 6 shows a modification of the FIG. 5 architecture that provides a more robust decoding function capable of accommodating disks with higher error rates.

There are other arrangements of inner code error correction logic 40 and the CRC Generator 32. FIG. 6 shows one particularly preferred alternate architecture for a DVD-ROM sector decoder. Elements of the FIG. 6 sector decoder that are substantially the same as corresponding elements of the FIG. 5 sector decoder are indicated by like reference numerals between the two figures.

In the architecture illustrated in FIG. 6, every inner code of incoming DVD-ROM sectors is corrected on the fly by the first inner code error correction logic 50. The output of the first inner code error correction logic 50 is a stream of once-inner-code-corrected data bits that is then provided to the CRC generator 32 and stored in the buffer memory 20 simultaneously. Therefore, the initial EDC result EDCA/V0 stored in the EDC file becomes the error characteristic (syndrome) of the DVD-ROM sector whose inner codes are corrected once. After an entire ECC block is stored to the buffer memory 20, the outer code error correction logic 42 is activated to process the outer codes. If, after the outer-code error correction errors remain in the sectors, the inner code and outer code error correction can be invoked again by activating the second inner code error correction logic 52 and the outer code error correction logic 42 alternately. On the other hand, the sectors with errors can be read once again from disk and the error correction and detection process can be repeated.

Particularly preferred embodiments of the present invention may also provide an outer code error correction strategy that improves the ability of a DVD-ROM sector decoder to retrieve data from defective disks. Conventional Reed-Solomon decoding proceeds in the following manner:

1. Calculate the syndromes of the Reed-Solomon code. If the syndromes are all zero, no detectable errors exist in the code and Steps 2 and 3 (below) are preferably skipped.

2. If one or more of the syndromes are non-zero, then find error locations and error patterns. From the syndrome data generated in Step 1, a set of equations can be formulated so that their solution provides the error locations and error patterns. The error locations are typically searched by one or another of the known iterative methods. Once the error locations are found, then the equations can be solved for the error patterns.

3. The Reed-Solomon codeword is corrected by adding ( ) the error patterns to the erroneous bytes identified by the error locations.

For a specific Reed-Solomon code, the maximum number of correctable errors is fixed. If too many errors exist in a Reed-Solomon code, two conditions may happen in Step 2. The first possibility is that the error locations cannot be resolved successfully. The second possibility is that some error locations are resolved but these error locations are not a true indication of errors in the code. Obviously, the second condition is worse, because the Reed-Solomon code will be wrongly corrected in Step 3 and the number of errors in the codeword increases.

When reading data from a defective DVD-ROM disk, the outer codes inevitably have an excessive number of errors. If such outer codes are processed by a conventional Reed-Solomon decoder, the scenario of an outer code being wrongly corrected occurs with undesirable frequency. Since the wrongly solved error locations can belong to any one of as many as eight different sectors of an ECC block, new errors may be induced into any of the eight sectors, including one or more sectors that previously may have been error-free. Thus, preferred embodiments of the present invention preferably provide a stricter validity checking method for requesting outer code error correction, as compared to conventional outer code error correction strategies.

In a DVD-ROM decoder architecture in accordance with aspects of the present invention, intermediate EDC results can be used to identify sectors that are already error-free. This is because the probability of an erroneous sector passing the EDC check is very low. More importantly, the EDC results are responsive to the error correction process while the error correction process is in progress. Because of this, the EDC results can be referenced to block any "error correction" attempts that would alter data within sectors that are currently indicated to be error-free. In a specific implementation of this strategy, the decoder may be configured so that, whenever the outer code error correction logic 42 solves the error locations and error patterns for an outer code, the outer code logic 42 will not correct the code unless, for each error pattern that is not zero, the corresponding error location does not point to a byte belonging to a sector whose EDC result is $\{S(x) \bmod g(x)\}$. In other words, if the error locations and error patterns show that there are errors in sectors that are presumed error-free (by examining their EDC results), the error locations and error patterns are considered invalid. Consequently, this inconsistent, questionable error information is discarded and the error correction process goes on to process the next outer code.

Figure 7:
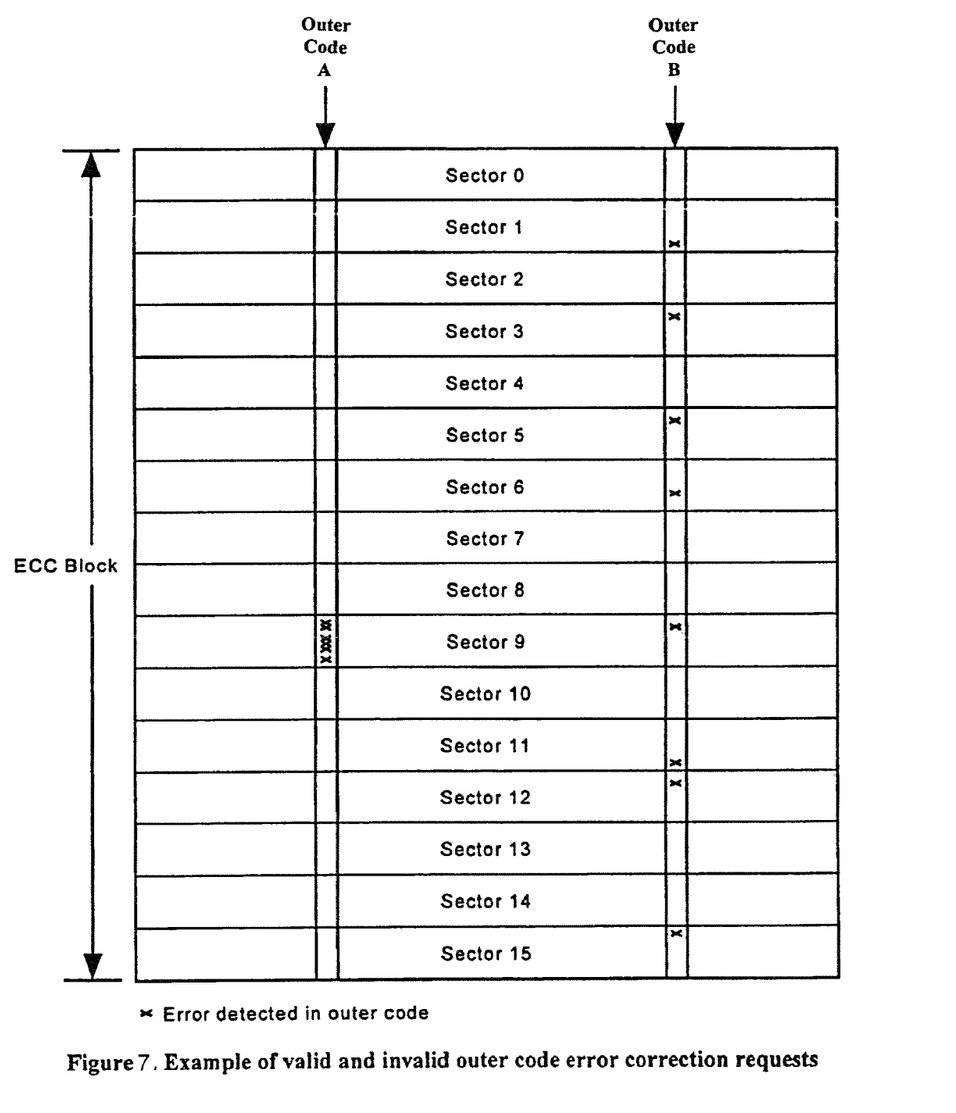
FIG. 7 schematically illustrates the reliable identification of errors through Reed-Solomon error correction and the unreliable identification of errors through Reed-Solomon error correction.

FIG. 7 shows how the use of this aspect of the invention can improve the result of outer code error correction. Initially, sectors 0 to 8 and sectors 10 to 15 were error-free, while sector 9 had many errors due to a defect such as a scratch. At some point in the data and error processing for the block, the outer code A was decoded and six errors were detected. Since all of these errors were identified at locations inside of sector 9, all of the errors are corrected using the error patterns and error locations. Later, outer code B is decoded and eight errors are detected. The EDC results show that some of the identified errors exist inside sectors whose EDC results indicate are free from errors. Preferred implementations of this aspect then conclude that the error patterns and error locations are invalid and no error corrections are made. Thus, the initially error-free sectors are still error-free, and the erroneous sector 9 still has some errors. To recover the data from sector 9, the inner code and outer code error corrections may be repeated, or the contents of sector 9 may be re-read from the disk.

Clearly, with the help of the responsive EDC results, a DVD-ROM decoder can be provided that has better performance in terms of error correction speed and reliability. This disclosure has been made in terms of certain preferred embodiments of the present invention. Those of ordinary skill in the art will appreciate that various modifications and alterations to these embodiments might be implemented without varying from the teaching of the present invention. As such, the present invention is not to be limited to any particular embodiment described here. Rather, the present invention is defined by the claims which follow.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting and detecting errors in data stored on an optical disk in a DVD format, retrieval and processing of the data stored on the optical disk in the DVD format including inner and outer code error correction for a Reed-Solomon product like code and an error detection process for evaluating an extent of errors in a sector of data, the sector of data encoded within a plurality of inner codes, parts of plural sectors encoded within each outer code, the method comprising:

calculating an initial error detection value for data within the sector;

performing an error correction operation on the data within the sector and determining an updated, intermediate error detection value responsive to the error correction operation;

using a target error detection value and one of the initial error detection value and the intermediate error detection value to determine that the sector does not include errors;

processing an outer code to provide a set of error patterns and error locations; and determining if any of the error locations are for data within the sector and not correcting data corresponding to the error locations within the sector.

2. The method of claim 1, wherein the data within the sector are scrambled so as to require descrambling before use by a host.

3. The method of claim 1, wherein the target error detection value is representative of information used in scrambling the data within the sector.

4. The method of claim 1, wherein inner code error correction is performed on the sector before calculating the initial error detection value.

5. The method of claim 1, wherein the initial error detection value is calculated by a CRC generator.

6. The method of claim 5, wherein the initial error detection value is calculated by a linear feedback shift register.

7. The method of claim 5, wherein the initial error detection value is calculated by dividing an error detection codeword comprising the bits of the data within the sector by the polynomial $g(x)=x^{32}+x^{31}+x^{4}+1$.

8. The method of claim 7, wherein the initial error detection value is calculated by a linear feedback shift register.

* * * * *